(12) United States Patent
Ebersohn

(10) Patent No.: US 11,354,146 B2
(45) Date of Patent: Jun. 7, 2022

(54) EMULATED REGISTER INPUT CONTROL ADAPTER

(71) Applicant: Uber Technologies, Inc., San Francisco, CA (US)

(72) Inventor: Gerhard Burger Ebersohn, Flower Mound, TX (US)

(73) Assignee: Uber Technologies, Inc., San Francisco, CA (US)

(*) Notice: Subject to any disclaimer, the term of this patent is extended or adjusted under 35 U.S.C. 154(b) by 1016 days.

(21) Appl. No.: 15/988,625

(22) Filed: May 24, 2018

(65) Prior Publication Data

US 2018/0341505 A1  Nov. 29, 2018

Related U.S. Application Data

(60) Provisional application No. 62/511,766, filed on May 26, 2017.

(51) Int. Cl.
| | |
|---|---|
| *G06F 9/455* | (2018.01) |
| *G06F 16/951* | (2019.01) |
| *G07G 1/14* | (2006.01) |
| *G06Q 30/06* | (2012.01) |
| *G07G 1/00* | (2006.01) |
| *G06Q 50/12* | (2012.01) |
| *G06Q 20/12* | (2012.01) |

(Continued)

(52) U.S. Cl.
CPC .......... *G06F 9/45529* (2013.01); *G06F 3/038* (2013.01); *G06F 9/451* (2018.02); *G06F 16/951* (2019.01); *G06Q 20/12* (2013.01); *G06Q 20/202* (2013.01); *G06Q 30/0601* (2013.01); *G06Q 50/12* (2013.01); *G07G 1/0009* (2013.01); *G07G 1/14* (2013.01)

(58) Field of Classification Search
CPC .... G06F 9/45529; G06F 9/451; G06F 16/951; G06F 3/038; G06Q 20/12; G06Q 20/202; G06Q 30/0601; G06Q 50/12; G07G 1/0009; G07G 1/14
See application file for complete search history.

(56) References Cited

U.S. PATENT DOCUMENTS

| | | |
|---|---|---|
| 2007/0094372 A1 | 4/2007 | Hariharan |
| 2008/0209446 A1 | 8/2008 | Grechanik |

(Continued)

OTHER PUBLICATIONS

Notification of Transmittal of the International Search Report and the Written Opinion of the International Searching Authority issued in PCT/US2018/034684 dated Aug. 1, 2018, 14 pages.

(Continued)

*Primary Examiner* — Justin C Mikowski
(74) *Attorney, Agent, or Firm* — Dority & Manning, P.A.

(57) ABSTRACT

Transaction data is received from a remote system with an Emulated Register Input Control Adapter (ERICA) application programming interface (API). The received transaction data is validated as validated data. The validated data is translated into a set of sequential events that are transmitted to an ERICA Module executing on a Point-of-Sale (POS) system terminal computer. The set of sequential events is processed with the ERICA Module to emulate user actions on a POS system Human Machine Interface (HMI). Result data generated by the sequential event processing is validated.

20 Claims, 5 Drawing Sheets

(51) Int. Cl.
*G06F 3/038* (2013.01)
*G06F 9/451* (2018.01)
*G06Q 20/20* (2012.01)

(56) References Cited

U.S. PATENT DOCUMENTS

2010/0257067 A1    10/2010   Chan
2010/0328232 A1*   12/2010   Wood .................... G06F 3/0488
                                                                 345/173

OTHER PUBLICATIONS

Bo Zhang et al., "A Black-Box Strategy to Migrate GUI-Based Legacy Systems to Web Services", IEEE International Symposium on Service-Oriented System Engineering, 2008, SOSE '08, Piscataway, NJ, USA, Dec. 18, 2008 (Dec. 18, 2008), pp. 25-31, XPo31381535, ISBN: 978-0-7695-3499-2.
ISR and Written Opinion in PCT/US2018/034684 dated Jul. 24, 2018.
Bo Zhang, et al., "A Black-Bos Strategy to Migrate GUI-Based Legacy Systems to Web Services", Service-Oriented System Engineering, 2008. SOSE '08. IEEE International Symposium on, IEEE, Piscataway, NJ Dec. 18, 2008.
IPRP in PCT/US2018/034684 dated Dec. 5, 2019.

* cited by examiner

EMULATED REGISTER INPUT CONTROL ADAPTER

This application claims priority to U.S. Provisional Patent Application No. 62/511,766, filed on May 26, 2017, which is incorporated by reference in its entirety.

BACKGROUND

Modern Point-of-Sale (POS) systems are primarily based around a Human Machine Interface (HMI), such as a graphical user interface (GUI) displayed on a computer display that provides various interactive options (for example, using a touchscreen or a keyboard/mouse to select elements of a GUI). Operations (such as, order input, system configuration management, and general operating functions) are performed through interaction with the POS system HMI. However, external, operating-system-level control of POS systems without dependencies on POS system software or licensing is not currently possible. This lack of operational flexibility prevents enhanced and optimized use of POS system functions by external systems.

SUMMARY

The present disclosure describes a universally-compatible, remote interface adapter for Point-of-Sale (POS) systems.

In an implementation, transaction data is received from a remote system with an Emulated Register Input Control Adapter (ERICA) application programming interface (API). The received transaction data is validated as validated data. The validated data is translated into a set of sequential events that are transmitted to an ERICA Module executing on a Point-of-Sale (POS) system terminal computer. The set of sequential events is processed with the ERICA Module to emulate user actions on a POS system Human Machine Interface (HMI). Result data generated by the sequential event processing is validated.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, store-level integration with POS system functions is offered for remote systems external to a POS system without dependencies on POS system software. A remote system can be considered to be any external digital computing system consistent with this disclosure. For the purposes of this disclosure and in the context of a digital computing system, the term "remote" or "external" can be used interchangeably, unless otherwise stated. Second, additional licensing and development fees that allow interaction with POS system functions through a traditional application programming interface (API) are eliminated. Third, external integration functions are separated from internal software, thereby avoiding a change of scope within local data security concerns. Fourth, remote interface adapter operating functions are initially configured and continuously improved upon through use of a unique application of machine learning and data mapping logic. Fifth, a self-sustained ecosystem is created that is dedicated to serving customer needs by processing requests originating from remote systems. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1A:
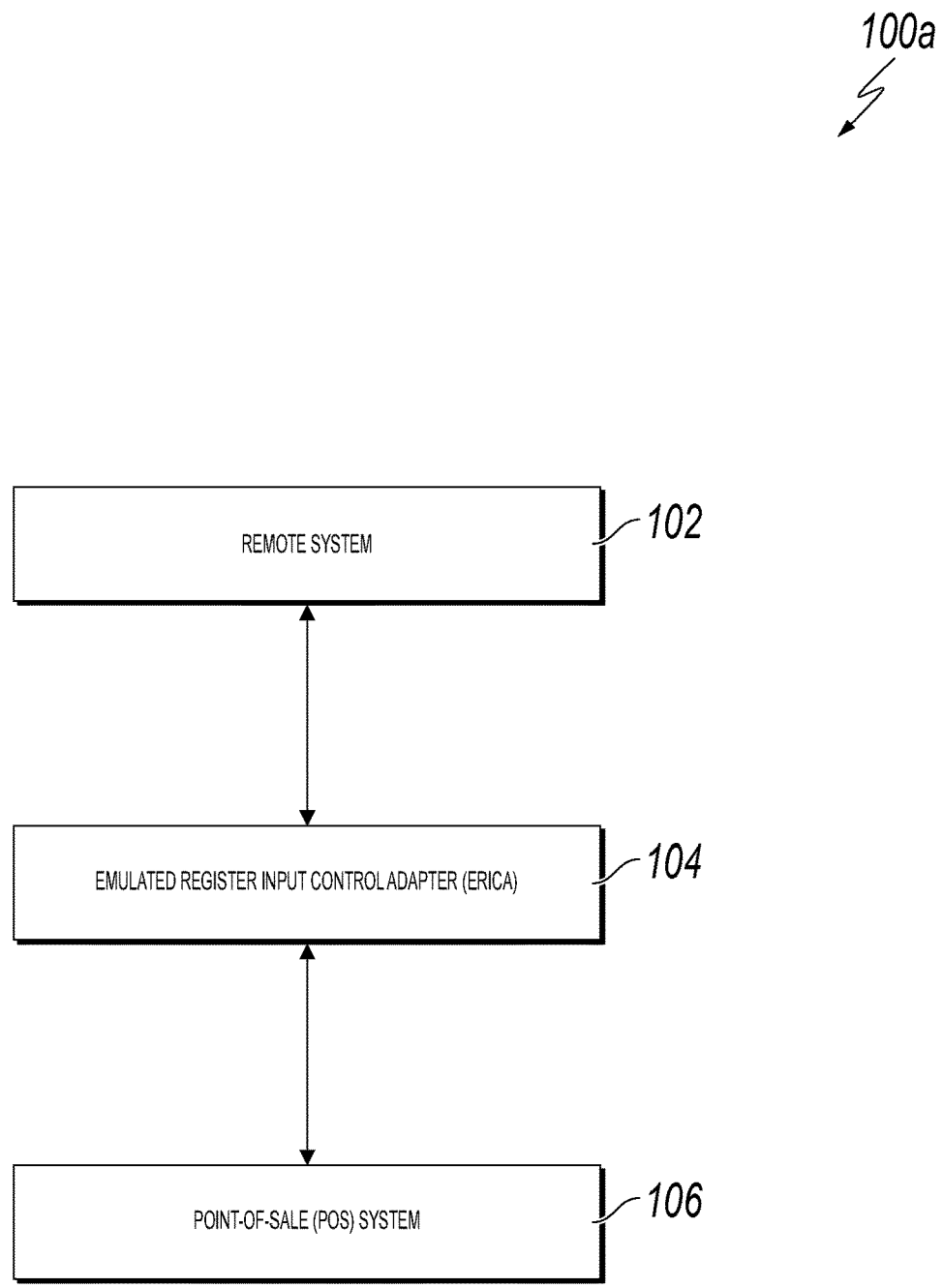
FIG. 1A is a high-level block diagram of an example distributed computing system (EDCS) including an Emulated Register Input Control Adapter (ERICA), according to an implementation.

The following detailed description describes a universally-compatible, remote interface adapter for Point-of-Sale (POS) systems.

For simplicity and purposes of explanation and understanding, this disclosure is focused generally on a discussion of POS systems, the most common example of a digital store management (DSM) system. However, the disclosure is not meant to be limited in scope to only POS systems, but broadly applicable to DSM systems (for example, inventory and accounts receivable/payable systems executing on independent restaurant mobile computing devices) that are controllable through use of the described concepts. For the purposes of this disclosure, a POS system and a DSM system (or equivalent terms/descriptions as understood by those of ordinary skill in the art) can be used interchangeably.

The disclosure is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations (for example, implementations related to restaurants), but to be accorded the widest scope consistent with the described principles and features.

Modern POS systems are primarily based around a Human Machine Interface (HMI), such as a graphical user interface (GUI) displayed on a computer display that provides various interactive options (for example, using a touchscreen or a keyboard/mouse to select elements of a GUI). POS system operations (for example, order input, system configuration management, and general operating functions) are performed through interaction with the POS system HMI. However, external, operating system (OS)-level control of POS systems, without dependencies on POS system software or licensing, is not currently possible. This lack of operational flexibility prevents enhanced usage of POS system functions by remote systems external to a POS system. A remote system can be considered to be any external digital computing system consistent with this disclosure. For the purposes of this disclosure and in the context of a digital computing system, the term "remote" or "external" can be used interchangeably, unless otherwise stated.

Described, at a high-level, is an Emulated Register Input Control Adapter (ERICA) that provides a universally compatible input/output (I/O) adaptive interface with POS systems by leveraging technologies that provide I/O control between various software applications running on a target POS system OS. An ERICA can emulate human HMI actions (for example, interacting with a touch screen, mouse, or keyboard) by processing remotely-provided coded commands and triggering a POS system's interface to perform corresponding operations (for example, the previously mentioned order input, system configuration management, and general operating functions).

In typical implementations, manufacturers configure POS systems with optional, licensed and cost-prohibitive API functions for remote data entry and transaction capturing operations. The optional API permits a POS system to be communicated with by a remote system (for example, by third party order aggregator) to perform particular operations (such as, order input, transaction capturing, edits, and the like). In other words, POS systems typically provide a licensed API permitting communication with a POS system in a particular format and conforming to a particular specification.

However, POS systems are typically not configured with an API that exposes basic operating functions to third-party remote systems. Apart from "hacking" into the software of a particular POS system and risking possible damage to the POS system, voiding warranties, and possible legal ramifications by violating licensing terms and conditions, the lack of an available, fully-featured, licensed API substantially limits operation of the POS system to physical interactions with the POS system's provided HMI.

In contrast to the use of a licensed API, the ERICA leverages the functionality of a native OS of a computing node in a POS system to act as an adapter "server" situated between a remote system and a particular POS system to translate externally-coded/formatted transaction instructions from a remote transaction source into logical events that be used to emulate human actions associated with a transaction. The logical events are used to deliver the transaction into the particular POS system.

In typical licensed API integrated solutions, the licensed API would reside on a main POS system server. From the system server, orders are distributed through internal functions to a designated register/terminal (or a set of registers/terminals) where an in-store staff member could interact with the order. The ERICA's focus is typically on a non-server computing node (for example, a terminal/register computer) since interaction is with a GUI is meant for sales clerks or other personnel. In some implementations, the ERICA can run on a server as long as the server is also executing a terminal that can be used by the ERICA.

The ERICA typically resides at the level of a particular entity (such as, a particular restaurant or other retail physical location) and is configured to execute on a computing node in a POS system non-server computing environment (for example, on a POS system's register or terminal computer). During an installation of the ERICA, specific permission to access and install software on the host computer can be requested from a user with appropriate permissions. As will be apparent to those of ordinary skill in the art, other security-related issues can be handled appropriately depending upon, for example, the OS used, security software, and the like. The ERICA does not modify, interfere, or conflict with existing POS system software. As the ERICA is hosted within the POS system's computing environment, commands passed to an ERICA can be converted into one or more human-emulated operational objectives (for example, capturing a restaurant order ticket) using the native OS of the ERICA-hosting computing node.

The ERICA enables external interaction by a remote system with POS system functions by emulating human actions on the POS system using a native OS's Human Interface libraries and contained functions. The remote system can interface with an ERICA to send a sequence of transactional events (for example, generated by a web site, portal, or command line interface) to perform one or more desired operations (for example, selecting an item on a menu or placing an order). Using POS system OS-level input commands, the ERICA can trigger events corresponding to manual HMI inputs (for example, a finger press on a POS system touchscreen) that accomplish the desired operations. Using the ERICA, it is not necessary for an actual human to perform the actions on the POS system HMI.

As a particular example, an order received from a user of a third party restaurant ordering service website (that is, a remote system) can be automatically translated by an ERICA into an order ticket at a local brick-and-mortar restaurant. To generate the order ticket, the ERICA can be used to access the restaurant's POS system and to issue commands to generate and place the user's order without the human intervention required if the user had physically entered the retail location and a sales clerk manually entered the order on the POS system. While the user travels to the retail location, the order placed by the ERICA can be prepared by the restaurant kitchen and the user can obtain the prepared order upon arrival. In some implementations, ERICA-initiated orders can be indicated in some way (for example, by a particular order code, label, or symbol on the POS system/order ticket) so that the POS system operator is notified that the order was remotely generated. In some implementations, the ERICA can be configured to store all received orders and to generate appropriate reports and metrics useful for analyzing the ERICA's operations.

Beyond the described input functions, the ERICA software can also be configured to provide additional controls (for example, table wait-listing, table booking, online ordering, delivery management, menu management functions, and automated POS features testing). The additional controls can also include training functionality (for example, through a Trainer Module) permitting ERICA operators to set up and maintain their own stores and menus with respect to POS systems.

An ERICA can be installed and utilized on existing computer systems without dependencies on particular in-store networks or shared WIFI routers. For example, built-in 4G/LTE-type connections, if available, can be configured to provide functional connectivity or as a connective backup to particular POS system in-store connections.

With respect to some of the previously-described functionality, an ERICA can be considered to be an artificially intelligent staff member, dedicated to serving online customer needs and ensuring order placement and management without requiring advanced technical knowledge for setup and configuration from the in-store operator setting up and managing the ERICA. The process for configuring an ERICA is a "train-once"-type (reusable) solution similar to steps undertaken to train a new human staff member that covers basics of register access, order placement, and item customization functions. Entities with standardized POS system configurations can benefit from reusable solutions with additional configured adaptive technologies catering for any particular differences that may be present at particular individual entity locations.

In typical implementations, the ERICA is configured to be available as downloadable software to install on a computing device (for example, a computing node in a POS system), where shared resources (such as the Internet) are available and not strictly controlled. Other alternatives can include a hardware dongle (for example, using Universal Serial Bus (USB)) with configured independent Internet connectivity and self-executable applications running externally to a computer interfacing with the hardware dongle.

The lack of a dependency on a back-end system allows rapid deployment of the ERICA, regardless of a manufacturer of a particular POS system and associated application versions or data differences (such as, with one or more departments for table booking or multiple menus and functions). For example, at a high-level, a version of the ERICA can be selected for use with a particular target POS system based simply on the OS/version of the target POS system (such as, UNIX/LINUX, WINDOWS, or other OS). In some implementations, other factors (such as, POS system hardware/software application interface characteristics), if relevant, can also be considered.

In typical implementations, one or more guided-type setup functions (for example, manual and automated) can streamline an operator's online activation and allow familiarization with an ERICA training interface while capturing necessary variables permitting the ERICA to emulate desired future actions. For example, a setup function can ask an ERICA operator to perform a particular combination of functions to emulate that would normally be performed by an in-store sales or a booking clerk. The setup function can then automatically record necessary data based on the operator's actions and generate necessary data/configurations (such as scripts) to allow the recorded actions to be emulated when the same functionality is requested by a remote system through external commands.

Typical implementations of ERICA are configured to enable automated self-maintenance. Automated self-maintenance permits POS-system-level changes to be detected and related mapping data (for example, residing in an external cloud database) can be automatically corrected by an ERICA Input module. The previously described Trainer Module can also be configured to request assistance from an actual POS system operator if provided external commands cannot successfully be relayed/performed based on previously configured/recorded functions. In some instances, manual override options can be made available to ERICA operators or remote systems. For example, if a POS system with ERICA is malfunctioning or manual operation is desired, a manual override can be activated to disable some or all of ERICA-provided functionality.

In typical implementations, one or more externally-accessible ERICA-provided APIs (such as, through a Software Development Kit (SDK)) are provided to permit robust and full-featured remote system interaction with a particular POS system. For example, commands can be passed to an ERICA API by a remote system (such as, the previously-described third party restaurant ordering service) to place an order for a particular product visible on a web site by a web site user. The received remote system commands can be used by an ERICA to trigger an associated POS system to perform remote-system-requested operations.

Turning to FIG. 1A, FIG. 1A is a high-level block diagram 100a of an example distributed computing system (EDCS) 100a including an ERICA, according to an implementation. Consistent with the previous description, the EDCS 100 includes a Remote System 102, an ERICA 104 with an associated cloud-computing-based ERICA API (not illustrated), and a POS System 106 with an associated native OS interface (for example, using Human Interface libraries) (not illustrated).

The Remote System 102 transmits coded instructions in a particular format to the ERICA API of the ERICA 104. The ERICA API translates the coded instructions received from the Remote System 102 into a set of sequential events to be performed by the POS System 106. Translations of the received coded instructions are typically performed in the cloud-computing environment of the ERICA API.

The ERICA 104 does not depend on middleware and is configured to avoid the need for middleware modules with the POS System 106 environment. Although not illustrated and as previously described, in typical implementations, the ERICA 104 does not execute on a server associated with or communicating with the POS System 106, but resides on a terminal computer associated with the POS System 106.

The ERICA 104 communicates with the POS System 106 using the native OS Interface. In some implementations, the received coded instructions are not translated into a format the POS System 106 will understand, but, instead, into a sequential list of human-emulation events transmitted to Human Interface libraries of the native OS Interface of the computer the ERICA 104 is executing on. For example, the sequential list of human-emulation events can include coordinates and sequences of clicks/presses/touches along with expected thumbprints and results of a final target event. The native OS Interface can be used to perform the sequential list of human-emulation events on the POS System 106.

In typical implementations, the POS System 106 does not transmit result data to the ERICA 104. The ERICA 104 scans for results displayed on the POS 106 terminal screen. For example, feedback/results can be obtained from scanning pre-defined areas of a screen GUI to validate results of input events (for example, using thumbprint-type data to check for targets to be selected). In some implementations, existing technologies are used to read pixels from a pre-defined area of a screen/GUI to determine if an action was performed successfully. The expected results after a final target event were previously sent from the API 112 to the ERICA Core 110 to assess results. Using the expected results, the ERICA Core 110 is able to assess results that were obtained from the screen GUI to determine if there is a match with the expected results.

Figure 1B:
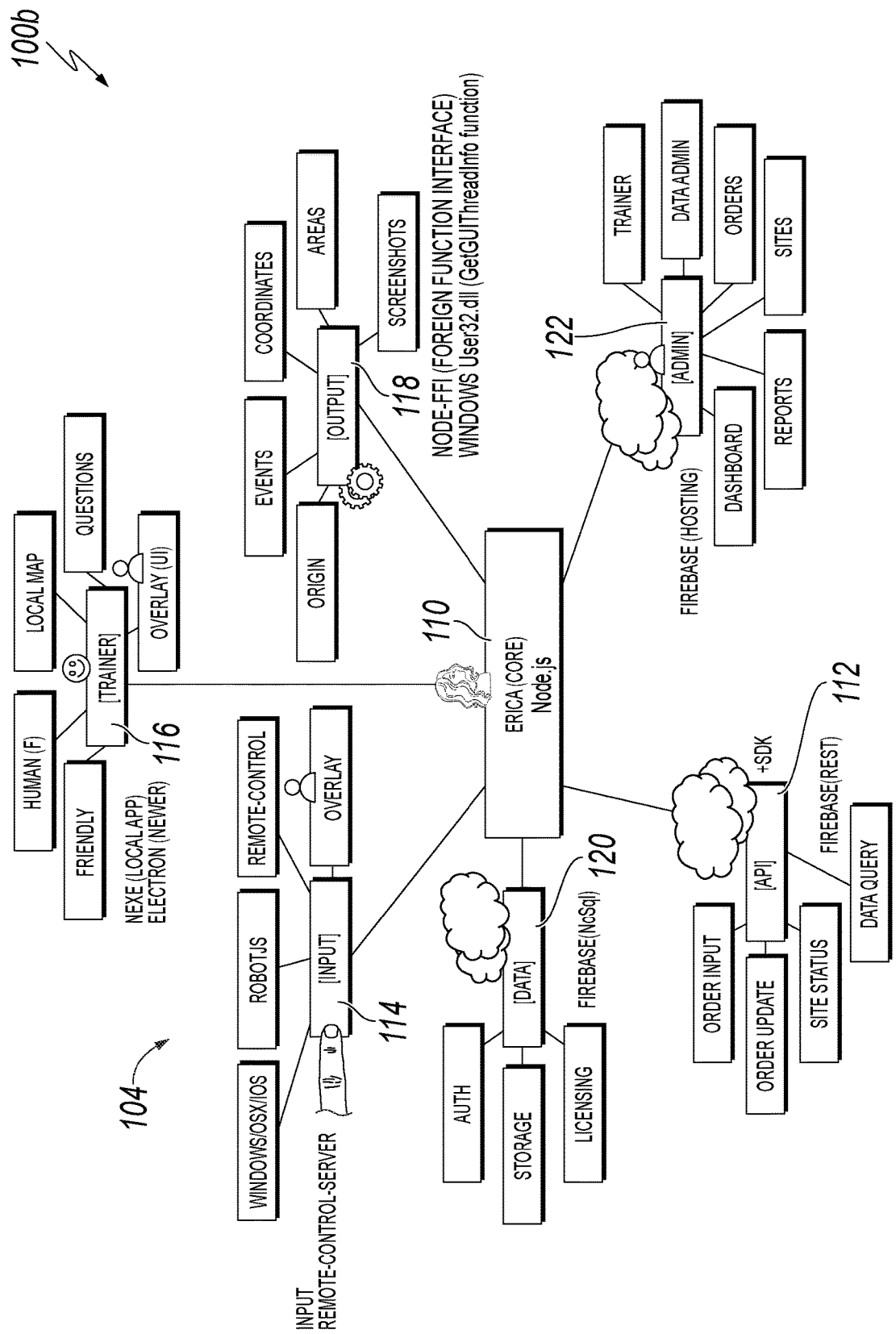
FIG. 1B is a block diagram illustrating example low-level components/modules of the ERICA of FIG. 1A, according to an implementation.

Turning to FIG. 1B, FIG. 1B is a block diagram 100b illustrating example low-level components/modules of the ERICA 104 of FIG. 1A, according to an implementation. ERICA 104 includes a Core Module ("Core") 110, API Module ("API") 112 (the cloud-computing-based ERICA API of FIG. 1A), Input Module ("Input") 114, Trainer Module ("Trainer") 116, Output Module ("Output") 118, Data Module ("Data") 120, and Admin Module ("Admin") 122. Note that all elements of FIG. 1B are not explicitly described. As will be appreciated by those of ordinary skill in the art, at least some of the non-described elements of FIG. 1B are standard or known by those of ordinary skill in the art. The Input 114 and Trainer 116 encompass primary order delivery functions and emulation of user actions. The Trainer 116 and Output 118 encompass described machine learning functionality. Modules executing in a cloud-computing environment are indicated in FIG. 1B with cloud symbols (for example, API 112, Data 120, and Admin 122.

As will be appreciated by those of ordinary skill in the art, FIGS. 1A and 1B illustrate only one possible implementation of an ERICA, and are not meant to limit the disclosure or concept in any way. Other implementations consistent with this disclosure are also possible. The other possible implementations, inasmuch as they are consistent with this disclosure, are considered to be within the scope of this disclosure. Additionally, and as will also be appreciated by those of ordinary skill in the art, there are a multitude of possible Remote System 102 implementations and configurations (for example, websites, portals, and command line interfaces), including formats, protocols, types, scopes, and purposes of any transmitted coded instructions received by an ERICA. Any implementations or configurations of the example Remote System 102 or transmitted coded instructions are not meant to limit the disclosure or described concepts in any way. Other possible implementations consistent with this disclosure are also possible and, inasmuch as they are consistent with this disclosure, are also considered to be within the scope of this disclosure.

In some implementations, Core 110 is built on NODE.JS, widely accepted as an industry standard for scalable web-based, high-complexity products. Core 110 is combined with OS-level code libraries and configured for support on multiple OSs (for example, MICROSOFT WINDOWS/SERVER, APPLE OS X and IOS, and ANDROID).

Although not illustrated in FIG. 1B, in some implementations, the Core 110 database is implemented using FIREBASE. FIREBASE is a real-time database providing cloud-computing-based backend-as-a-service functionality.

The ERICA provides application developers a Representational State Transfer (REST) API 112 that allows application data to be synchronized across clients and stored in a cloud-based computing environment (for example, GOOGLE, AMAZON, or MICROSOFT CLOUD). The database is accessible through API 112 using REST calls and bindings for JAVASCRIPT frameworks (for example, NODE.JS). In some implementations, the API 112 can use the SERVER-SENT EVENTS (SSE) protocol for creating HTTP connections to receiving push notifications from a server. SSE enables efficient server-to-client streaming of event data (for example, text-based). As illustrated, API 112 is shown receiving "Order Input," "Order Update," "Site Status," and "Data Query" REST calls. Other REST calls consistent with this disclosure are also considered to be within the scope of this disclosure.

API 112 can include an SDK permitting remote systems (for example, third-party systems) to access the API 112. The SDK provides a consistent, full-featured API allowing various remote systems (for example, online ordering, table wait-listing, table booking, delivery services, and order aggregators) to send commands to the ERICA (Core 110).

In some implementations, Input 114 is a server application targeted specifically to reside/execute on a POS System 106 register or terminal computer (the "target machine"). By executing on a register or terminal computer, Input 114 will not interfere or conflict with existing POS System 106 server software. Input 114 is configured for support on multiple OSs (for example, MICROSOFT WINDOWS/SERVER, APPLE OS X and IOS, and ANDROID). The Input 114 is used to perform click, touch, and key functions within a particular OS environment.

Configuration of the Input 114 can include ROBOTJS (a NODE.JS library allowing external commands to control a target machine by sending commands that emulate user actions (for example, a touchscreen is pressed, mouse/finger movement, and keyboard activity) and REMOTE-CONTROL-SERVER (a NODE.JS library that executes the server functionality and permits remote systems to connect to and send ROBOTJS commands to the target machine.

The primary function of Input 114 is to emulate user actions based on a data-feed received from the API 112. For example, in some implementations, Input 114 can receive pre-parsed JAVASCRIPT OBJECT NOTATION (JSON) digest data from the API 112. The Input 114 translates the digest data into sequences of user action line items to control input devices.

In some implementations, controlling input devices, would include on-screen "aim," "click," and "press" sequences. For example, Input 114 can use the MICROSOFT WINDOWS User32.dll library functions "SetPhysicalCursorPos" or "SetCursorPos" to set a position of a cursor in physical coordinates and ROBOTJS to execute "click" or "press" events to navigate around a POS System 106 terminal screen and to find final target buttons to complete each user action line item.

The Trainer 116 is a branded, public-facing interface to the ERICA. Trainer 116 is configured to execute on the POS System 106 terminal and to provide a human-like "artificial intelligence" personality (for example, female, professional, likable, and friendly). Trainer 116 can be configured to execute on multiple OSs (for example, MICROSOFT WINDOWS/SERVER, APPLE OS X and IOS, and ANDROID).

Some implementations of the Trainer 116 can include ELECTRON, an open source product permitting HTML/JAVASCRIPT/ANGULARJS websites to be built as applications. These applications can be configured to execute on multiple OSs (for example, MICROSOFT WINDOWS/SERVER, APPLE OS X and IOS, and ANDROID). Trainer 116 can also include NEXE (a NODE.JS application similar to ELECTRON but primarily focused on the MICROSOFT WINDOWS OS—necessary for some OS-level command triggers).

Trainer 116 includes a GUI Overlay, a graphical element utilizing minimal space on the POS System 106 terminal's primary application display. The Overlay can include a movable docking point used to drag and anchor the Overlay interface to address potential instances where there is a conflict with POS functions underneath the Overlay. The Overlay can also include one or more primary status indicators providing a current status of the ERICA. For example, the one or more primary status indicators can include: 1) Blue—busy processing an order (paired with a full-screen Overlay indicating branding and a message noting that order processing is in progress); 2) Green—ready to accept orders; 3) Orange—requires assistance (for example, conflict resolution); and 4) Red—offline, cannot process orders.

While not illustrated, Trainer 116 also includes a Terminal Status Handler that is configured to check for system availability by tapping into the Output 118's recording functions. For example, Output 118's recording functions can include automatic detection of in-progress user input, prompting for approval to process orders if in queue, and broadcasting a ready-status to Input 114 if not in use.

The Trainer 116 also includes conflict resolution (machine learning) functionality that requests human-intervention, as-needed, to capture data from within the POS System 106 environment. For example, the conflict resolution functionality can include: 1) initial system setup and training (capturing user action data) to capture user-account information (such as, staff ID) and basic system configuration and learning; 2) requesting assistance with order item capturing; and 3) notification of required system updates preventing operation.

In some implementations, when an ERICA is installed, the ERICA can prompt the operator to perform training functions to prepare and optimize the ERICA for operation. Trainer 116 will take the operator through a training process (for example, adding basic items with ingredients and where to select on the display to achieve different results). The ERICA will record the operator actions (for example, identifying X-Y coordinates and events and how many screens need to be traversed to select a particular item) to either perform them in their entirety or as many of the operator actions as possible and to prompt the operator to manually perform actions that cannot be automated or to correct actions that were incorrectly captured.

Output 118 provides functionality to learn from human interactions with the Trainer 116. Output 118 provides functionality (for example, using controls) to record and transmit events to the API 112. For example, a NODE-FFI (a Foreign Function Interface permitting access to information within MICROSOFT WINDOWS controlled by other applications (such as, in the POS System 106). NODE-FFI permits recording touch coordinates and other input events on the POS System 106. Additionally, User32.dll (accessible through NODE.JS using NODE-FFI) is a MICROSOFT WINDOWS library broadcasting user-triggered events for availability to external applications. Example Output 118 functions can include:

1. Obtaining a context of user actions to be captured
    Use built-in operating system libraries to determine the target application's information along with the current screen size/resolution. With the obtained context (for example, system, GUI and screen resolution) for a POS System 106 terminal/application, events relevant to data-mining efforts can be recorded. Relevant events include, for example, click events, cursor position at the time of an event, color of screen pixels surrounding the event, and the actions leading up to the final target event. In some implementations, functions for obtaining the context can include:
    a. GetSystemMetrics (MICROSOFT WINDOWS)—gather information about input/output devices to determine what captured data is relevant,
    b. EnumDisplaySettings (MICROSOFT WINDOWS). For example:
        1) lpszDeviceName [in] the default display adapter's properties will be returned if no ID is specified,
        2) iModeNum [in] get current settings of targeted display adapter, and
        3) getScreenResolution to get the actual width and height of the screen,
    c. GetGUIThreadInfo (MICROSOFT WINDOWS)—retrieves information about the active window or a specified GUI thread. For example:
        1) GetWindowThreadProcessId—find relevant ID for POS Terminal GUI thread
        2) idThread [in] where the identifier is used for the thread for which information is to be retrieved, and
        3) lpgui [in, out] for a target GUI thread
2. Looking for relevant events within the obtained context:
    a. Check for mouse clicks or screen press events—for example, import the SetWindowsHookEx( . . . ) function from the User32.dll to detect mouse clicks within a target application, if this is relevant based on performed system diagnostics, and
    b. GetCursorPos
        1) lpPoint [out] A pointer to a POINT structure that receives the screen coordinates of the cursor. The cursor position is specified in screen coordinates and is not affected by the mapping mode of a window that contains the cursor.
3. Capturing user action data
    a. Cursor Position—(X, Y) coordinate of the primary event of interest,
    b. Capture "end" of input stream through Trainer 116, allowing a hierarchy of events to be determined (for example, how many events deep to find the final target within the various screens).
        1) Keep data for each event leading up to final target event, and
        2) Label each event with index value for association,
    c. Generate "Thumbprint" by capturing colors of pixels in 16×16 pixel block around cursor position. In some implementations, the result is an array of 256 hexadecimal color values representing each pixel in range (for example, #ff0000 for red).
        1) Combine GDI32.dll and User32.dll functions—Graphics Device Interface (GDI) functions for device output, such as those for drawing and font management, and
        2) Coordinate Geometry will be utilized to determine the start and end point of each side to be captured. For example:
            A.X=X−8, A.Y=Y−8,
            B.X=X+8, B.Y=Y−8,
            C.X=X+8, C.Y=Y+8, and
            D.X=X−8, DY=Y+8.
4. Storing recorded data with an order item object (in Data 120, FIG. 1B)
    a. Object with Order Item Detail as received from Input 114,
    b. Object with User Action data indexes leading up to final target event,
    c. Final target event cursor coordinates (for example, an (X, Y) coordinate value pair), and
    d. Array with Thumbprint color values.
    Note that the described examples only represent a portion of the data it is possible to store in Data 120 (Licensing and Authentication data represent other data examples). In some implementations, using Firebase allows for creation of an authentication layer within the database that ensures that data destined for a data store X only reaches store X. Product licensing can also be handled to only accept data using an API 112 for store X's ordering provider if incoming API calls have an associated (paid) license for the functions attempted to be used on a POS system.

Figure 2:
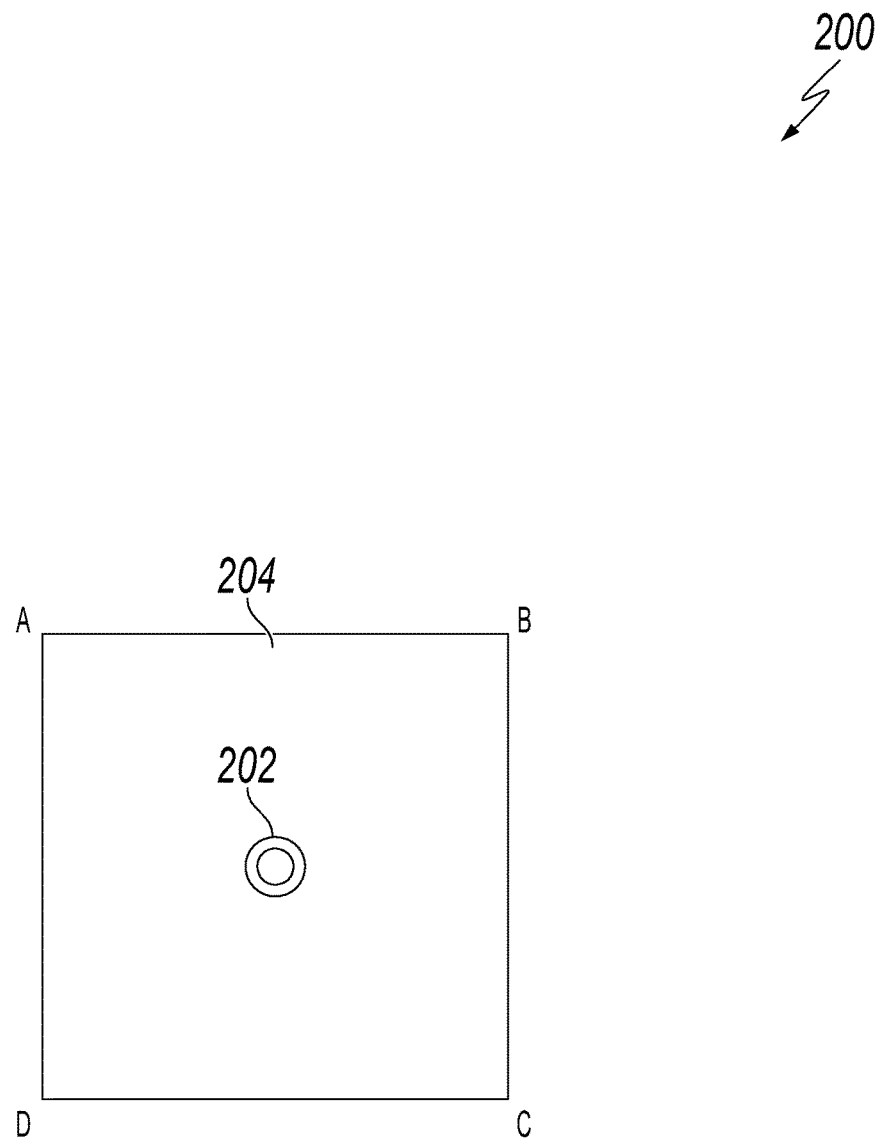
FIG. 2 is a diagram illustrating capture of a "thumbprint" on a Point-of-Sale (POS) system Human Machine Interface (HMI), according to an implementation.

With respect to previously described 3(c) (generate Thumbprint), FIG. 2 is a diagram 200 illustrating capture of a "thumbprint" on a POS system HMI (for example, a touchscreen), according to an implementation. Circles 202 represent a cursor and also the center of a "target" of a click event. For example, a block 204 for a click event can be 16×16 pixels wide, allowing for 256 color values to be stored to form a "thumbprint." In typical implementations, cursor 202 is just 1×1 pixel and represents an exact coordinate of a target event.

In some implementations, Admin 122 can be a portal. For example, Admin 122 can include a Management Interface (Web-based) offering day-to-day management of order processing systems; a Web-based issue resolution interface (for example, providing overrides for in-store training), functionality to manage support requests, general menu maintenance features, and new license issuance for multi-unit operators.

Figure 3:
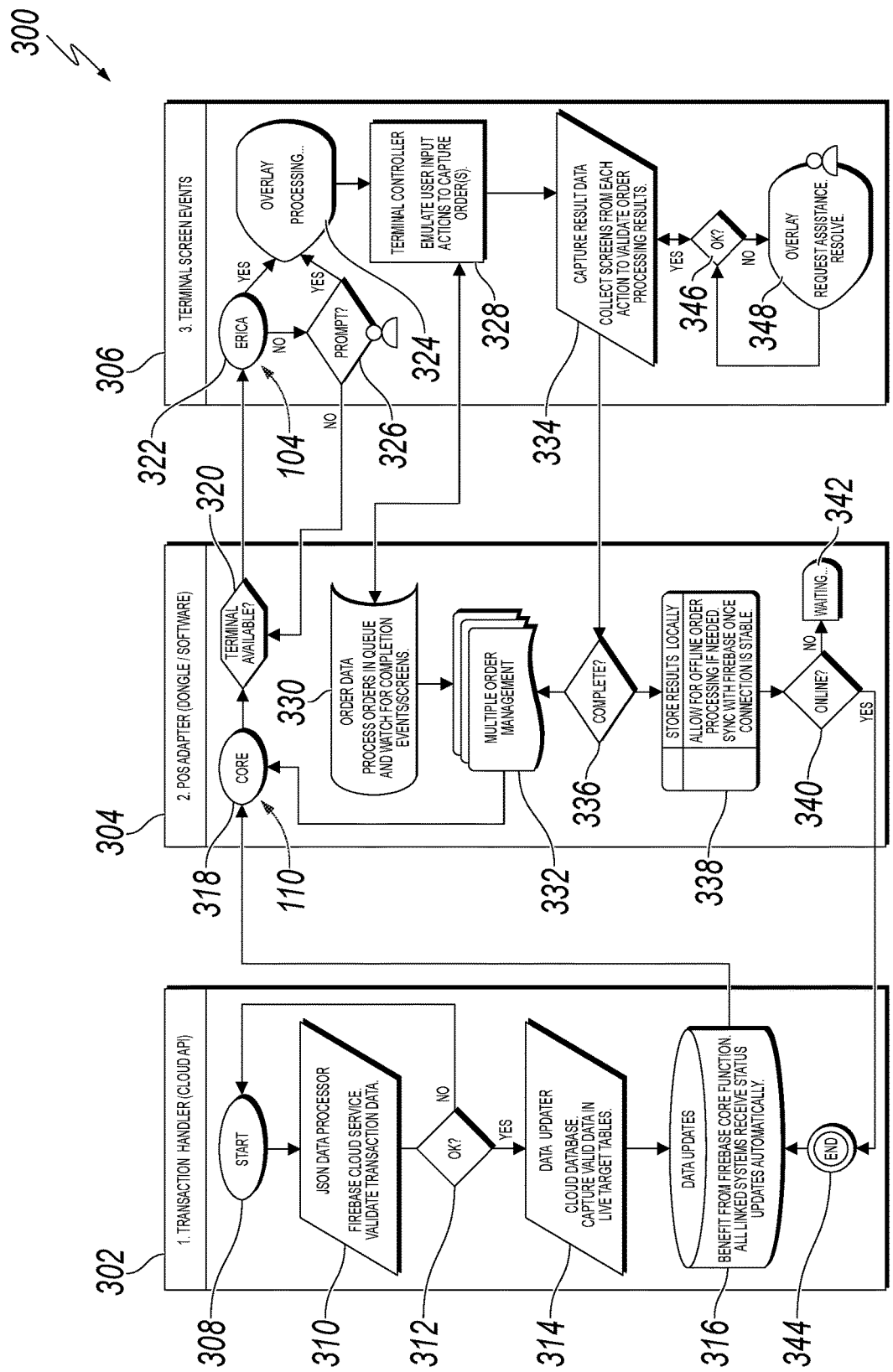
FIG. 3 is a flowchart illustrating an example method for use of the ERICA of FIGS. 1A and 1B, according to an implementation.

Turning to FIG. 3, FIG. 3 is a flowchart illustrating an example method 300 for use of the ERICA of FIGS. 1A and 1B, according to an implementation. For clarity of presentation, the description that follows generally describes method 300 in the context of the other figures in this description. However, it will be understood that method 300 may be performed, for example, by any suitable system, environment, software, and hardware, or a combination of systems, environments, software, and hardware, as appropriate. In some implementations, various steps of method 300 can be run in parallel, in combination, in loops, or in any order. As illustrated in FIG. 3, method 300 is divided between a Transaction Handler 302 (for example, a cloud API or website), a POS Adapter 304, and Terminal Screen Events 306.

At 308, method 300 starts. For example, a transaction for a product placed on a remote system (for example, a third-party web site) can trigger the Transaction Handler 302 to manage data associated with the transaction. The remote system transforms received transaction data into a JSON format for receipt by an ERICA's API. From 308, method 300 proceeds to 310.

At 310, transaction data received through the ERICA's API is validated. In some implementations, validation is performed by a JSON Data Processor provided by a FIREBASE database cloud service. Data validation can include questions such as who the transaction data is from (for example, an authorized remote system), is the transaction data being submitted to a location in which the ERICA resides, and is the transaction data corrupt or does it contain bad data. From 310, method 300 proceeds to 312.

At 312, a determination is made whether the transaction data is valid. If it is determined that the transaction data is not valid, method 300 proceeds back to 308 where a failure message would be sent back to originating source. If it is determined that the transaction data is valid, method 300 proceeds to 314.

At 314, the transaction data is captured by a Data Updater. From 314, method 300 proceeds to 316.

At 316, the Data Updater commits the transaction data to a database (for example, a database of orders) in the FIREBASE Cloud Service. The transaction data is translated into a set of sequential events to be performed by the POS System. In some implementations, the translation can be performed by one or more of the Data Updater or other component (not illustrated) of the Transaction Handler/Cloud API. From 316, method 300 proceeds to 318.

At 318, the database publishes the transaction data to the Core (for example, Core 110 in FIG. 1B) of the ERICA using the API associated with the Core (API 112 in FIG. 1B). The Core processes the transaction data. From 318, method 300 proceeds to 320.

At 320, the Core initiates a determination of whether there is a terminal available associated with a POS System (for example, POS System 106 in FIG. 1A). For example, a terminal could be a terminal in the restaurant where a waiter would input an order. From 320, method 300 proceeds to 322.

At 322, if it is determined that a terminal is available, method 300 proceeds to 324. Otherwise, if it is determined that a terminal is not available, method 300 proceeds to 326.

At 324, an Overlay can be placed on the terminal screen (for example, covering the entire terminal screen) to indicate that the transaction is being processed. From 324, method 300 proceeds to 328.

At 326, an Overlay prompt can be placed on the terminal screen (for example, in a corner of the terminal screen) informing an operator that a transaction is ready to be processed and requesting permission to proceed. If the respond to the prompt is YES, method 300 proceeds back to 324. However, if the response to the prompt is NO, the transaction remains in a waiting loop. The prompt can remain in the corner of the terminal screen and method 300 proceeds back to 320.

If it is determined, using the prompt, that a terminal is not available (for example, the terminal is in use by an in-store operator), an overlay is not rendered due to the use. If the ERICA is already busy processing an order, additional time will be taken on the terminal to complete all orders in the queue. If, however, it is determined that a terminal is available, method 300 proceeds to 326.

At 326, the overlay can be configured (for example, to cover the entire terminal screen) to indicate that the order is processing. From 326, method 300 proceeds to 328.

At 328, local operating system libraries are accessed to emulate user input actions for capturing orders. From 328, method 300 proceeds to 330.

At 330, the order data is processed by the ERICA from a queue. From 330, method 300 proceeds to 332.

At 332, if there are still other orders to complete that are being managed, the data is sent to the Core at 318.

Note that from 328, method 300 also proceeds to 334, where result data from processed orders is captured. Screens are collected from each action to validate order processing results. From 334, method 300 proceeds to 336.

At 336, method 300 flow splits to proceed to both 332 and 338 (for example, using two threads). The system will continue to check for additional orders (332) or go back into the waiting loop if there are none, while proceeding with update notifications that follow from 338 that are sent to cloud storage. Note that at 336, at least one order will be complete (from 334).

At 338, captured result data is stored in a local data store (for example, a USB device, a data storage on the POS System terminal computer, or a data storage on an ERICA dongle device) for offline order processing if necessary. Typically, the local data store is self-sufficient and independent of in-store systems. In typical implementations, information stored in the local data store can include completion status (for example, what was the order and when was it completed) or order failure and reasons for the failure.

Once a stable online connection is made from the ERICA to the online storage database, the locally stored data can be synced to the FIREBASE database from the local data storage and the ERICA API can be notified that the order has been fully processed (as indicated by the determination performed at 340, 342, and 344).

At 346 (as needed from 334), a determination is made whether the capture of the result data was successful and without errors requiring assistance. If it is determined that the capture of the result data was successful, method 300 proceeds back to 334. However, if it is determined that manual assistance is required due to some problem capturing the result data, method 300 proceeds to 348. Only once all requirements are met will it be considered that a single transaction is "complete" and an exit occurs to 336.

At 348, an overlay can be placed on the terminal screen prompting a POS System operator for assistance to resolve the determined problem with capturing the result data. From 348, method 300 proceeds back to 346 in a loop.

Figure 4:
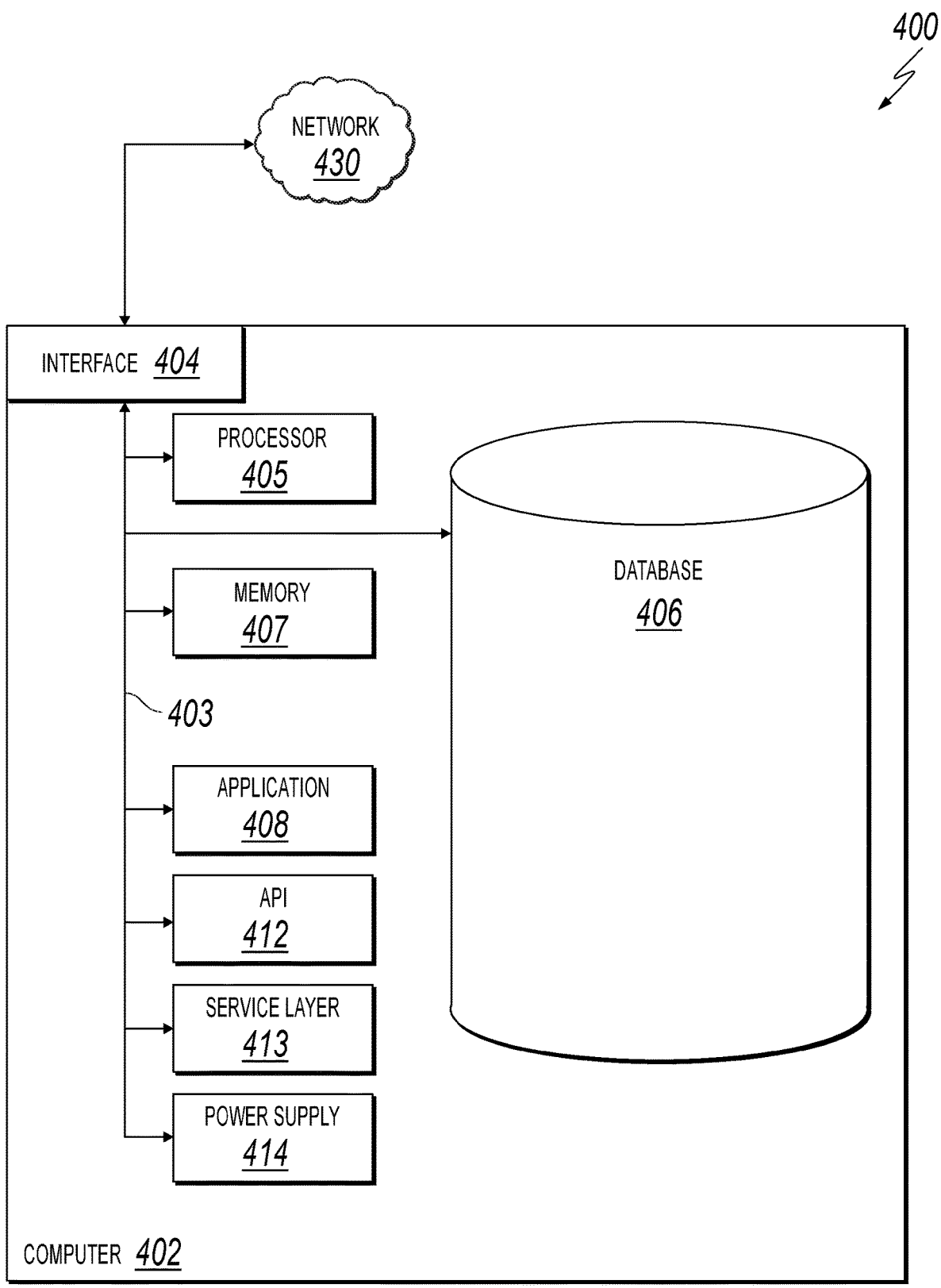
FIG. 4 is a block diagram illustrating an example computer system used to provide computational functionalities associated with described algorithms, methods, functions, processes, flows, and procedures as described in the instant disclosure, according to an implementation.

FIG. 4 is a block diagram of an example computer system 400 used to provide computational functionalities associated with described algorithms, methods, functions, processes, flows, and procedures, as described in the instant disclosure, according to an implementation. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 402 may comprise a computer that includes an input device, such as a keypad, keyboard, touch screen, or other device that can accept user information, and an output device that conveys information associated with the operation of the computer 402, including digital data, visual, or audio information (or a combination of information), or a graphical user interface (GUI).

The computer 402 can serve in a role as a client, network component, a server, a database or other persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, or other server (or a combination of servers).

The computer 402 can receive requests over network 430 from a client application (for example, executing on another computer 402) and respond to the received requests by processing the received requests using an appropriate software application(s). In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, hardware or software (or a combination of both hardware and software), may interface with each other or the interface 404 (or a combination of both), over the system bus 403 using an application programming interface (API) 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems that are connected to the network 430 (whether illustrated or not) in a distributed environment. Generally, the interface 404 comprises logic encoded in software or hardware (or a combination of software and hardware) and is operable to communicate with the network 430. More specifically, the interface 404 may comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a database 406 that can hold data for the computer 402 or other components (or a combination of both) that can be connected to the network 430 (whether illustrated or not). For example, database 406 can be an in-memory, conventional, or other type of database storing data consistent with this disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases (of the same or combination of types) can be used according to particular needs, desires, or particular implementations of the computer 402 and the described functionality. While database 406 is illustrated as an integral component of the computer 402, in alternative implementations, database 406 can be external to the computer 402.

The computer 402 also includes a memory 407 that can hold data for the computer 402 or other components (or a combination of both) that can be connected to the network 430 (whether illustrated or not). For example, memory 407 can be random access memory (RAM), read-only memory (ROM), optical, magnetic, and the like, storing data consistent with this disclosure. In some implementations, memory 407 can be a combination of two or more different types of memory (for example, a combination of RAM and magnetic storage) according to particular needs, desires, or particular implementations of the computer 402 and the described functionality. Although illustrated as a single memory 407 in FIG. 4, two or more memories 407 (of the same or combination of types) can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in this disclosure. For example, application 408 can serve as one or more components, modules, or applications. Further, although illustrated as a single application 408, the application 408 may be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or other power management functionality). In some implementations, the power-supply 414 can include a power plug to allow the computer 402 to be plugged into a wall socket or other power source to, for example, power the computer 402 or recharge a rechargeable battery.

There may be any number of computers 402 associated with, or external to, a computer system containing computer 402, each computer 402 communicating over network 430. Further, the term "client," "user," and other appropriate terminology may be used interchangeably, as appropriate, without departing from the scope of this disclosure. Moreover, this disclosure contemplates that many users may use one computer 402, or that one user may use multiple computers 402.

Described implementations of the subject matter can include one or more features, alone or in combination.

For example, in a first implementation, a computer-implemented method, comprising: receiving transaction data from a remote system with an Emulated Register Input Control Adapter (ERICA) application programming interface (API); validating the received transaction data as validated data; translating the validated data into a set of sequential events; transmitting the set of sequential events to an ERICA Module executing on a Point-of-Sale (POS) system terminal computer; processing the set of sequential events with the ERICA Module to emulate user actions on a POS system Human Machine Interface (HMI); and validating result data generated by the sequential event processing.

The foregoing and other described implementations can each, optionally, include one or more of the following features:

A first feature, combinable with any of the following features, wherein the ERICA API executes in a cloud-based computing environment.

A second feature, combinable with any of the previous or following features, further comprising receiving expected results of the transaction data along with the transaction data.

A third feature, combinable with any of the previous or following features, further comprising committing the validated data to a cloud-based database associated with the ERICA API.

A fourth feature, combinable with any of the previous or following features, wherein the ERICA Module interfaces with the POS system terminal computer using native operating system (OS) Human Interface libraries.

A fifth feature, combinable with any of the previous or following features, further comprising capturing, with the ERICA Module, pixel data from a defined block around a cursor position on a graphical user interface (GUI) of the POS system HMI.

A sixth feature, combinable with any of the previous or following features, further comprising determining whether the capturing of the pixel data was successful.

In a second implementation, a non-transitory, computer-readable medium storing one or more instructions executable by a computer system to perform operations comprising: receiving transaction data from a remote system with an Emulated Register Input Control Adapter (ERICA) application programming interface (API); validating the received transaction data as validated data; translating the validated data into a set of sequential events; transmitting the set of sequential events to an ERICA Module executing on a Point-of-Sale (POS) system terminal computer; processing the set of sequential events with the ERICA Module to emulate user actions on a POS system Human Machine Interface (HMI); and validating result data generated by the sequential event processing.

The foregoing and other described implementations can each, optionally, include one or more of the following features:

A first feature, combinable with any of the following features, wherein the ERICA API executes in a cloud-based computing environment.

A second feature, combinable with any of the previous or following features, further comprising one or more instructions to receive expected results of the transaction data along with the transaction data.

A third feature, combinable with any of the previous or following features, further comprising one or more instructions to commit the validated data to a cloud-based database associated with the ERICA API.

A fourth feature, combinable with any of the previous or following features, wherein the ERICA Module interfaces with the POS system terminal computer using native operating system (OS) Human Interface libraries.

A fifth feature, combinable with any of the previous or following features, further comprising one or more instructions to capture, with the ERICA Module, pixel data from a defined block around a cursor position on a graphical user interface (GUI) of the POS system HMI.

A sixth feature, combinable with any of the previous or following features, further comprising one or more instructions to determine whether the capturing of the pixel data was successful.

In a third implementation, a computer-implemented system, comprising: a computer memory; and a hardware processor interoperably coupled with the computer memory and configured to perform operations comprising: receiving transaction data from a remote system with an Emulated Register Input Control Adapter (ERICA) application programming interface (API); validating the received transaction data as validated data; translating the validated data into a set of sequential events; transmitting the set of sequential events to an ERICA Module executing on a Point-of-Sale (POS) system terminal computer; processing the set of sequential events with the ERICA Module to emulate user actions on a POS system Human Machine Interface (HMI); and validating result data generated by the sequential event processing.

The foregoing and other described implementations can each, optionally, include one or more of the following features:

A first feature, combinable with any of the following features, wherein the ERICA API executes in a cloud-based computing environment.

A second feature, combinable with any of the previous or following features, further configured to receive expected results of the transaction data along with the transaction data.

A third feature, combinable with any of the previous or following features, further configured to commit the validated data to a cloud-based database associated with the ERICA API.

A fourth feature, combinable with any of the previous or following features, wherein the ERICA Module interfaces with the POS system terminal computer using native operating system (OS) Human Interface libraries.

A fifth feature, combinable with any of the previous or following features, further configured to capture, with the ERICA Module, pixel data from a defined block around a cursor position on a graphical user interface (GUI) of the POS system HMI.

A sixth feature, combinable with any of the previous or following features, further configured to determine whether the capturing of the pixel data was successful.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display of) data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving transaction data from a remote system with an Emulated Register Input Control Adapter (ERICA) application programming interface (API), the transaction data indicative of an order placed on the remote system;
   validating the received transaction data as validated data;
   translating the validated data into a set of sequential events based on the order, the set of sequential events indicative of a plurality of user actions for inputting the order at the POS system terminal computer;
   transmitting the set of sequential events to an ERICA Module executing on the POS system terminal computer;
   processing the set of sequential events with the ERICA Module to emulate user actions on a POS system Human Machine interface (HMI); and
   validating result data generated by the sequential event processing.

2. The computer-implemented method of claim 1, wherein the ERICA API executes in a cloud-based computing environment.

3. The computer-implemented method of claim 1, further comprising receiving expected results of the transaction data along with the transaction data.

4. The computer-implemented method of claim 1, further comprising committing the validated data to a cloud-based database associated with the ERICA API.

5. The computer-implemented method of claim 1, wherein the ERICA Module comprises a plurality of native operating system (OS) Human Interface libraries corresponding to a plurality of different operating systems, and wherein the ERICA Module interfaces with the POS system terminal computer using one or more native OS Human Interface libraries that correspond to the POS system HMI.

6. The computer-implemented method of claim 1, further comprising capturing, with the ERICA Module, pixel data from a defined block around a cursor position on a graphical user interface (GUI) of the POS system HMI.

7. The computer-implemented method of claim 6, further comprising determining whether the capturing of the pixel data was successful.

8. A non-transitory, computer-readable medium storing one or more instructions executable by a computer system to perform operations comprising:
   receiving transaction data from a remote system with an Emulated Register Input Control Adapter (ERICA) application programming interface (API), the transaction data indicative of an order placed on the remote system;
   validating the received transaction data as validated data;
   translating the validated data into a set of sequential events based on the order, the set of sequential events comprising, the set of sequential events indicative of a plurality of user actions for inputting the order at the POS system terminal computer;
   transmitting the set of sequential events to an ERICA Module executing on the POS system terminal computer;
   processing the set of sequential events with the ERICA Module to emulate user actions on a POS system Human Machine Interface (HMI); and
   validating result data generated by the sequential event processing.

9. The non-transitory, computer-readable medium of claim 8, further comprising one or more instructions to receive expected results of the transaction data along with the transaction data.

10. The non-transitory, computer-readable medium of claim 8, further comprising one or more instructions to commit the validated data to a cloud-based database associated with the ERICA API.

11. The non-transitory, computer-readable medium of claim 8, wherein the ERICA Module interfaces with the POS system terminal computer using native operating system (OS) Human Interface libraries.

12. The non-transitory, computer-readable medium of claim 8, further comprising one or more instructions to capture, with the ERICA Module, pixel data from a defined block around a cursor position on a graphical user interface (GUI) of the POS system HMI.

13. The non-transitory, computer-readable medium of claim 12, further comprising one or more instructions to determine whether the capturing of the pixel data was successful.

14. A computer-implemented system, comprising:
    a computer memory; and
    a hardware processor interoperably coupled with the computer memory and configured to perform operations comprising:
      receiving transaction data from a remote system with an Emulated Register input Control Adapter (ERICA)

application programming interface (API), the transaction data indicative of an order placed on the remote system;

validating the received transaction data as validated data;

translating the validated data into a set of sequential events based on the order, the set of sequential events indicative of a plurality of user actions for inputting the order at the POS system terminal computer;

transmitting the set of sequential events to an ERICA Module executing on the POS system terminal computer;

processing the set of sequential events with the ERICA Module to emulate user actions on a POS system Human Machine Interface (HMI); and validating result data generated by the sequential event processing.

15. The computer-implemented system of claim 14, further configured to receive expected results of the transaction data along with the transaction data.

16. The computer-implemented system of claim 14, further configured to commit the validated data to a cloud-based database associated with the ERICA API.

17. The computer-implemented system of claim 14, wherein the ERICA Module comprises a plurality of native operating system (OS) Human Interface libraries corresponding to a plurality of different operating systems, and wherein the ERICA Module interfaces with the POS system terminal computer using one or more native OS Human Interface libraries that correspond to the POS system HMI.

18. The computer-implemented system of claim 14, further configured to:

capture, with the ERICA Module, pixel data from a defined block around a cursor position on a graphical user interface (GUI) of the POS system HMI; and determine whether the capturing of the pixel data was successful.

19. The computer-implemented method of claim 1; further comprising:

transmitting the set of sequential events to the ERICA Module executing on the POS system terminal computer in response to determining that the POS system terminal computer is available.

20. The computer-implemented method of claim 1, further comprising:

initiating the presentation of an overlay on a terminal screen associated with the POS system terminal computer.

\* \* \* \* \*